J. DIZMÁCSÉK.
PADLOCK.
APPLICATION FILED NOV. 2, 1914.
1,126,417.
Patented Jan. 26, 1915.
3 SHEETS—SHEET 1.
Fig. 1.
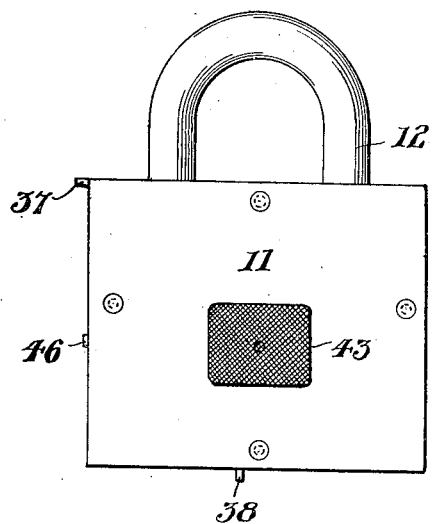
Fig. 2.
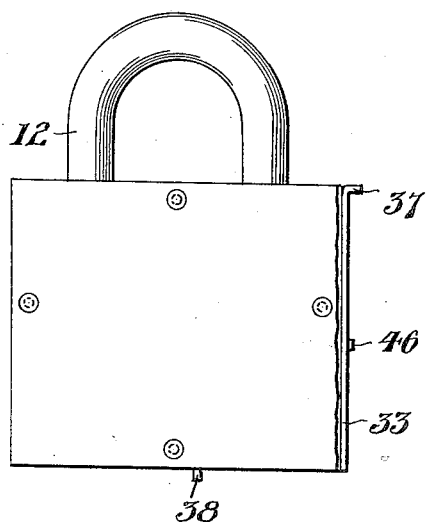
Fig. 3.
Fig. 4.
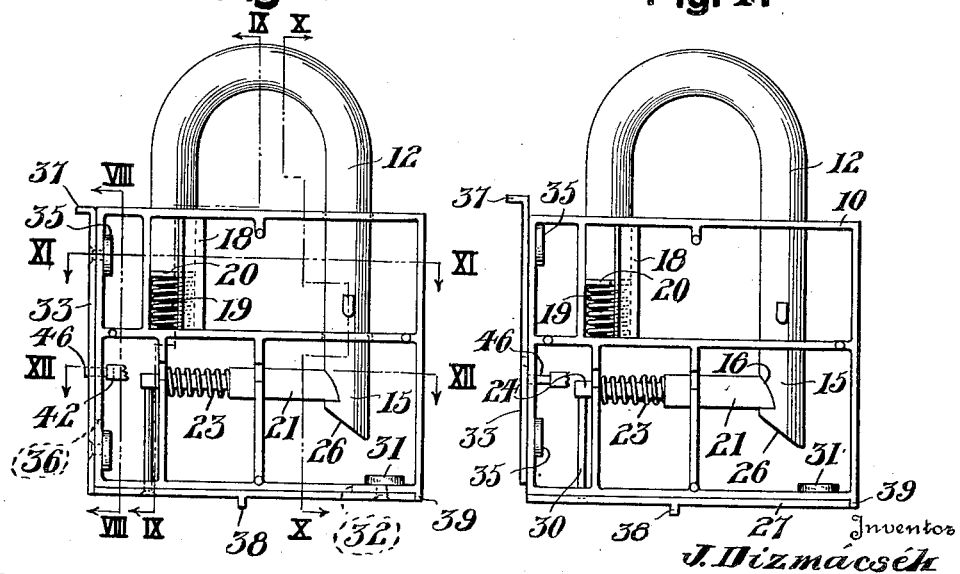
Inventor
J. Dizmácsék
Witnesses
R. B. Takács
A. M. Lowry
By A. M. Wilson
Attorney

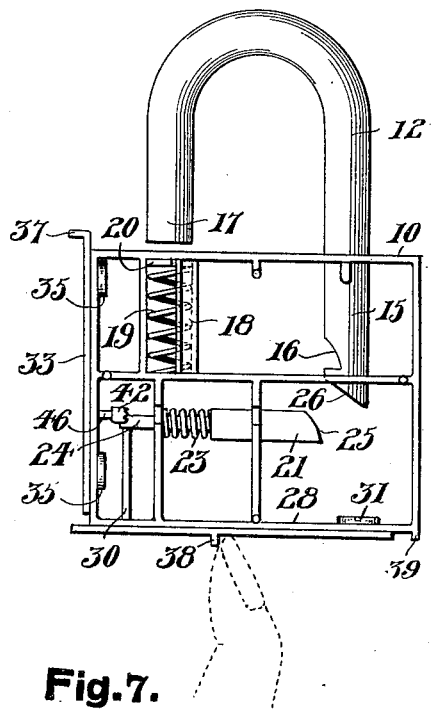
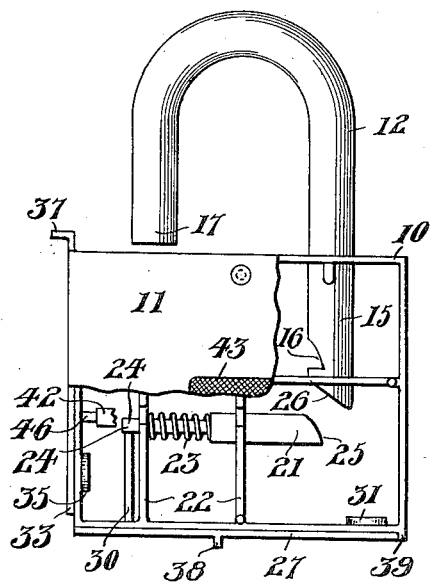
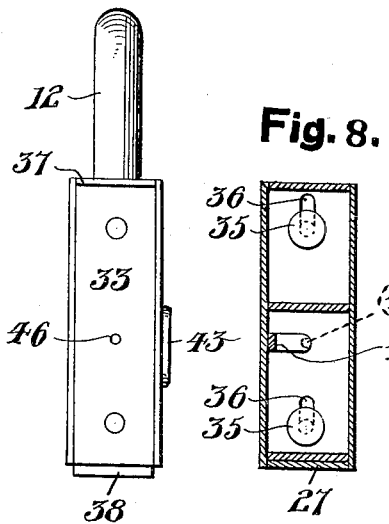
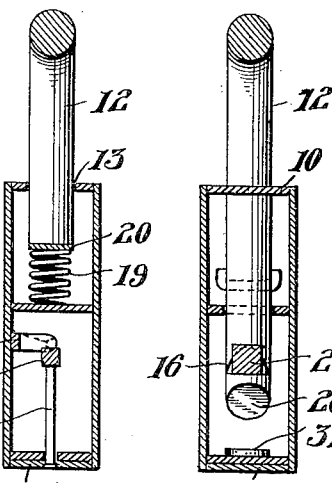

J. DIZMÁCSEK.
PADLOCK.
APPLICATION FILED NOV. 2, 1914.
1,126,417.
Patented Jan. 26, 1915.
3 SHEETS—SHEET 3.
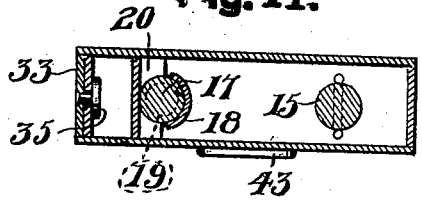
Fig. 11.
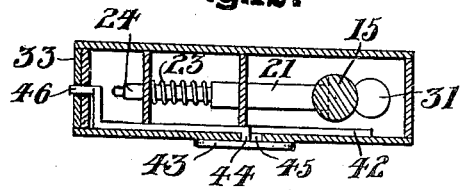
Fig. 12.
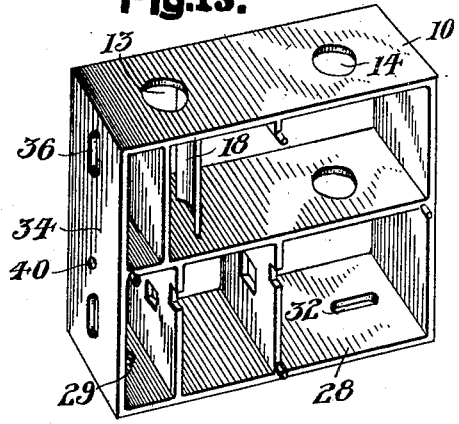
Fig. 13.
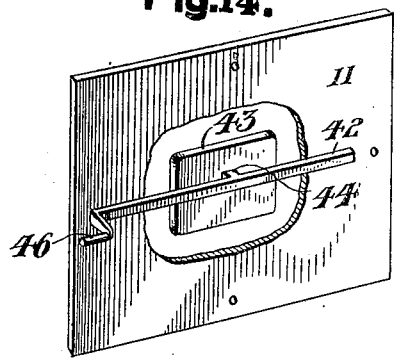
Fig. 14.
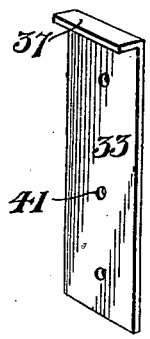
Fig. 15.
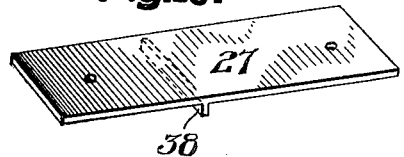
Fig. 16.
Fig. 17.
Fig. 18.
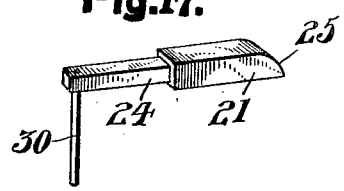
Witnesses
R. B. Takács
A. M. Lowry
Inventor
J. Dizmácsek
By A. M. Wilson
Attorney

UNITED STATES PATENT OFFICE.

JULIUS DIZMÁCSÉK, OF DUQUESNE, PENNSYLVANIA.

PADLOCK.

1,126,417.   Specification of Letters Patent.   Patented Jan. 26, 1915.

Application filed November 2, 1914.   Serial No. 869,926.

*To all whom it may concern:*

Be it known that I, JULIUS DIZMÁCSÉK, subject of the King of Hungary, residing at Duquesne, in the county of Allegheny and State of Pennsylvania, have invented certain new and useful Improvements in Padlocks, of which the following is a specification.

This invention relates to certain new and useful improvements in padlocks.

The primary object of the invention is to provide a padlock operable without the employment of a key and having blind unlocking means whereby an unauthorized person would be unable to actuate the lock.

A further object is to provide a keyless padlock with a spring bolt shiftable in an unlocking position from the exterior of the lock casing and having a plurality of shiftably releasable guards requiring initial operation prior to the shifting of the spring bolt.

With these general objects in view and others that will appear as the nature of the invention is better understood, the same consists in the novel combination and arrangement of parts to be hereinafter more fully described, illustrated in the accompanying drawings, and pointed out in the appended claims.

In the drawings forming a part of this application and in which like designating characters refer to corresponding parts throughout the several views, Figure 1 is a front elevation of the device in its locked position. Fig. 2 is a rear elevation thereof. Fig. 3 is a view similar to Fig. 1 but with the front plate of the casing removed. Fig. 4 is a similar view but with the locking plate retracted. Fig. 5 is a similar view to Fig. 3 and with the locking plates and bolt shifting mechanism retracted with the lock in its unlocked position. Fig. 6 is a view similar to Fig. 5, but with the releasing bolt normally positioned for again engaging the shackle. Fig. 7 is an end view of the lock. Fig. 8 is a transverse sectional view thereof taken upon line VIII—VIII of Fig. 3. Fig. 9 is a similar sectional view upon line IX—IX of Fig. 3. Figs. 10, 11 and 12 are similar sectional views taken upon lines X—X, XI—XI, XII—XII respectively of Fig. 3. Fig. 13 is a perspective view of the lock casing with the mechanism and the front and rear plates removed therefrom. Fig. 14 is a perspective view of the front plate of the casing partially broken away. Fig. 15 is a perspective view of the shiftable end guard plate removed. Fig. 16 is a similar view of the bolt carrying plate removed. Fig. 17 is a perspective view of the bolt removed, and Fig. 18 is a perspective view of the spring-pressed plate adapted to engage the shackle.

Referring more in detail to the drawings the lock broadly consists of a substantially rectangular casing 10 hvaing a front side plate 11 and adapted to slidably position a shackle 12 through the casing openings 13 and 14, it being noted that the longer end 15 of the shackle remains at all times within the casing and is provided with a notch 16 in one side thereof while the shorter end 17 of the shackle is removable from the opening 13 thereof while the shackle is capable of revolving in the opening 14. A well or chamber 18 is provided in the casing in alinement with the openings 13 and adapted to position an expansion spring 19 therein for normally pressing outwardly a bearing plate 20 adapted to be resiliently engaged by the shackle ends 17 when retracted within the openings 13 and whereby the shackle may be pressed inwardly against the action of the said spring 19 until the notch 16 engages the bolt 21 slidably mounted within the casing in similar partitions or walls 22 thereof. A coil spring 23 encircles the reduced portion 24 of the bolt 21 for normally projecting the oblique free end 25 thereof directly beneath the lower oblique end 26 of the shackle end 15 and whereby as will be apparent, a forcing downwardly of the shackle from its position as shown in Fig. 6, will automatically engage the bolt 21 with the shackle notch 16 and retain the shackle in its locked position. A slide plate 27 is mounted upon the outer side of the lower wall 28 of the casing and is provided with a slot 29 through which a post 30 is projected which has its inner end fixed to the free end of the bolt portion 24, while a rivet or similar means 31 projects through a slot 32 in the casing end 28 and is secured to the plate 27 for further controlling the sliding movement of the said plate. The plate 27 is thus shiftable as shown in Fig. 5 for releasing the shackle.

A guard plate 33 is slidably mounted upon the end wall 34 of the casing by means of rivets 35 projecting through similar slots 36 in the said wall and is provided with an end flange 37 for grasping when desired to shift the said plate. It will here be noted that the plate 27 is also furnished with a hand-hold rib 38 and that the casing has a corner projection 39 acting as an end stop for the actuating plate 27. The wall 34 is provided with an opening 40 therein with which an opening 41 in the guard plate 33 is adapted to be brought into alinement when the said plate 33 is positioned as illustrated in Fig. 3.

A rod 42 is slidably positioned within the casing upon the inner face of the front plate 11 thereof, and is connected by a slide disk 43 upon the outer face of front plate by means of a lug 44 projecting through a slot 45 in the said plate. The rod 42 is provided with an angularly positioned cylindrical end 46 normally in alinement with the aforementioned opening 40. By this arrangement it will be seen that when the actuating plate 27 is positioned as illustrated in Figs. 4 and 6, the guard plate 33 may be slid downwardly to its position illustrated in Fig. 3 and whereby the plate 27 is then locked against sliding movement for releasing the shackle. In this position of the guard plate 33 the opening 41 thereof alines with the opening 40 of the casing end 34 so that the disk 43 may be slidably moved for inserting the cylindrical end 46 of the bar 42 through the openings 40 and 41.

From this description of the invention and the operation of the several elements, it will be evident that with the elements positioned as illustrated in Fig. 3, a sliding movement of the disk 43 in a direction away from the guard plate 33 retracts the rod end 46 from the alined openings 40 and 41 and whereupon, the said plate 33 being thereby released, the same is shiftable for removing its end which is opposite to the hand-hold flange 37 out of the path of movement of the actuating plate 27 and whereupon the actuating plate may be forced slidably for moving the bolt 21 out of engagement with the shackle notch 16 and against the compression of the spring 23. This release of the shackle allows the socketed spring 19 to force the shackle outwardly to its unlocked position and at which time it may be partially revolved if desired, while the bolt spring 23 projects the bolt 21 to its normal position as illustrated in Fig. 6 and so as to be again engaged with the shackle by means of the notch 16 thereof for holding the shackle in its retracted locked position.

It will thus be seen that a padlock is provided that may be readily locked and unlocked by a person familiar with the operations thereof and that no key is necessary while an unauthorized person being unfamiliar with the arrangement of plate and disk shifting means would be unable to manipulate the lock or to pick the same.

While the forms of the invention herein shown and described are what are believed to be the preferred embodiments thereof, it is nevertheless to be understood that minor changes may be made without departing from the spirit and scope of the invention as claimed.

What I claim as new is:—

1. A lock comprising a casing having openings in the side thereof, an automatically retracted shackle within said openings, a spring-pressed bolt for said shackle within said casing, shiftable means exteriorly of said casing for shifting said bolt and guard controlling means for said shiftable means.

2. A lock comprising a casing, a shackle slidable therein, resilient retracting means for said shackle, a spring-pressed retaining bolt for said shackle positioned within said casing, an actuating plate slidably mounted upon said casing, a connecting post between said plate and bolt, a guard plate slidably mounted upon said casing and adapted for projection within the unlocking path of movement of said actuating plate.

3. A lock comprising a casing, an automatically projectable shackle carried thereby, an automatic engaging bolt for said shackle within said casing, an actuating plate slidably mounted upon one side of said casing, a post secured between said plate and bolt, a guard plate slidably mounted upon an adjacent side of the casing and adapted to project in the plane of movement of said actuating plate when the bolt is normally positioned and having an opening therethrough, the side of said casing which is furnished with said guard plate being provided with an opening adapted to aline with the opening of said guard plate, a shiftable rod mounted upon the inner side of one wall of the casing and having a cylindrical end adapted to project through the said openings when positioned in alinement and a shiftable actuating disk for said rod secured to said rod and flatly positioned upon the exterior of the casing.

In testimony whereof I affix my signature in presence of two witnesses.

JULIUS DIZMÁCSÉK.

Witnesses:
W. H. BEATTY,
L. A. WILLLIAMS.

Copies of this patent may be obtained for five cents each, by addressing the "Commissioner of Patents, Washington, D. C."